Nov. 6, 1928.

C. N. BERGMANN ET AL 1,690,920

CUP DEPOSITING MECHANISM FOR UNIT MEASURING MACHINES

Filed July 2, 1925 4 Sheets-Sheet 2

Nov. 6, 1928.

C. N. BERGMANN ET AL 1,690,920

CUP DEPOSITING MECHANISM FOR UNIT MEASURING MACHINES

Filed July 2, 1925

INVENTORS.
Christian N. Bergmann
BY Elmer F. Taylor
Cyrus Taylor
C. M. Clarke ATTORNEY.

Nov. 6, 1928.

C. N. BERGMANN ET AL 1,690,920

CUP DEPOSITING MECHANISM FOR UNIT MEASURING MACHINES

Filed July 2, 1925    4 Sheets-Sheet 4

INVENTORS.
Christian N. Bergmann
Elmer Z. Taylor
Cyrus Taylor
BY
C. M. Clarke
ATTORNEY.

Patented Nov. 6, 1928.

1,690,920

UNITED STATES PATENT OFFICE.

CHRISTIAN N. BERGMANN, OF PITTSBURGH, PENNSYLVANIA; ELMER Z. TAYLOR, OF NEWARK, NEW JERSEY; AND CYRUS TAYLOR, OF HARTFORD, CONNECTICUT, ASSIGNORS TO BERGMANN PACKAGING MACHINE COMPANY, OF PITTSBURGH, PENNSYLVANIA, A CORPORATION OF DELAWARE.

CUP-DEPOSITING MECHANISM FOR UNIT-MEASURING MACHINES.

Application filed July 2, 1925. Serial No. 41,105.

This invention consists of an improved mechanism for placing a cup shaped receptacle in position, by detachment from a nested series, utilizing supporting, raising and lowering means, as hereinafter described.

Our invention relates to improvements in machines for measuring and covering units of mobile material, as ice-cream, for separating such measured units from a mass, depositing them separately into containers or receptacles, capping the receptacles, and ejecting the filled receptacles. The machine is generally similar in its main elements to that shown in a prior application filed by C. N. Bergmann et al. on April 4, 1925, Serial No. 20,696, but differs therefrom mainly in the use of an intermittently rotatable carrying turret for the receptacles, instead of longitudinally movable carrying trays, in an improved cup depositing mechanism, and in other respects hereinafter described.

The machine embodying the present invention is also generally similar to that shown and described in a copending companion application, Serial No. 40,796, and relates particularly to mechanism for selecting and placing the cups or receptacles in the carrier for the further operations of filling, capping, and discharging.

The machine as a whole comprises a rotatable turret wheel having an annular series of cup receiving cavities, means by which each cavity is brought successively in registering position underneath the cup depositer, the filling mechanism, the capper, and then over the ejector, respectively.

The cup depositing mechanism herein involved embodies means in the form of gripping jaws which close and open around the lowermost cup for release and subsequent grasping support of the next upper cup and the column, as hereinafter described.

The mechanism operates in sequential relation to the various other operative parts, with suitable rest periods.

In the drawings illustrating one preferred embodiment of the invention:

Figure 1:
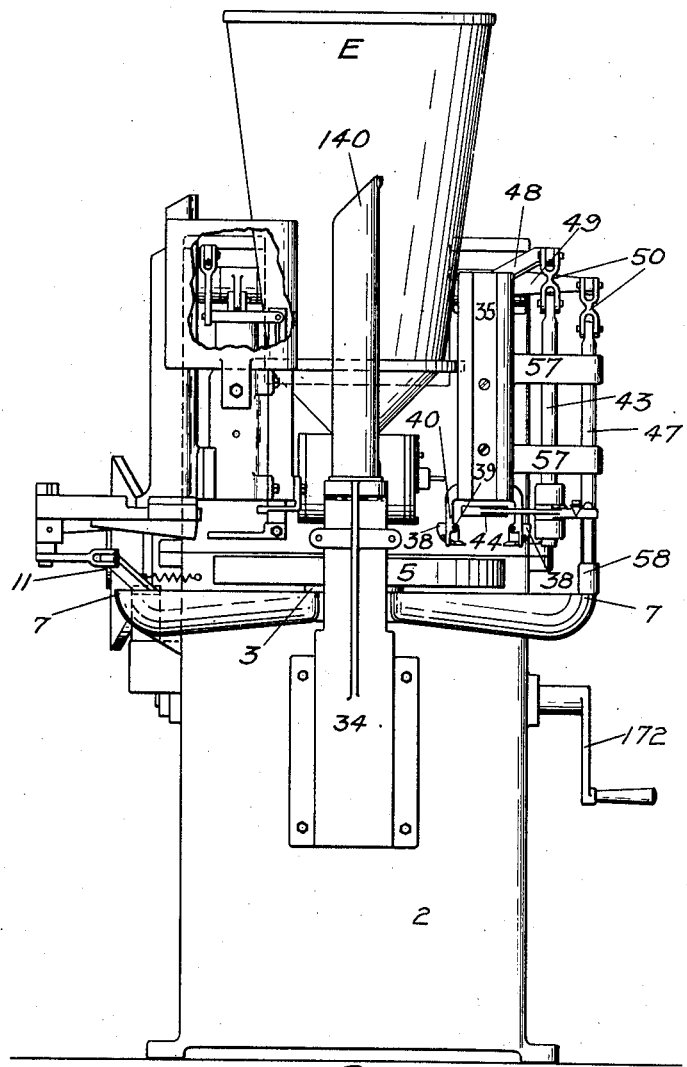
Figure 1 is a view of the machine in front elevation.

Referring to the drawings, the operative portions of the machine are mounted upon and within a hollow box-shaped base 2 of cast metal supported upon the floor or foundation by a suitable flat pedestal, as in Fig. 1. At the front middle portion of the base is a vertically arranged bearing 3 in which is rotatably mounted the central depending stem 4 of the turret 5. Bearing 3 is cast integral with a laterally extending transverse bottom wall 6, forming a concave dish or basin, surrounding the turret beyond the lower base and providing a rearwardly inclined collecting and drainage cavity for excess cream, washing, etc.

Figure 3:
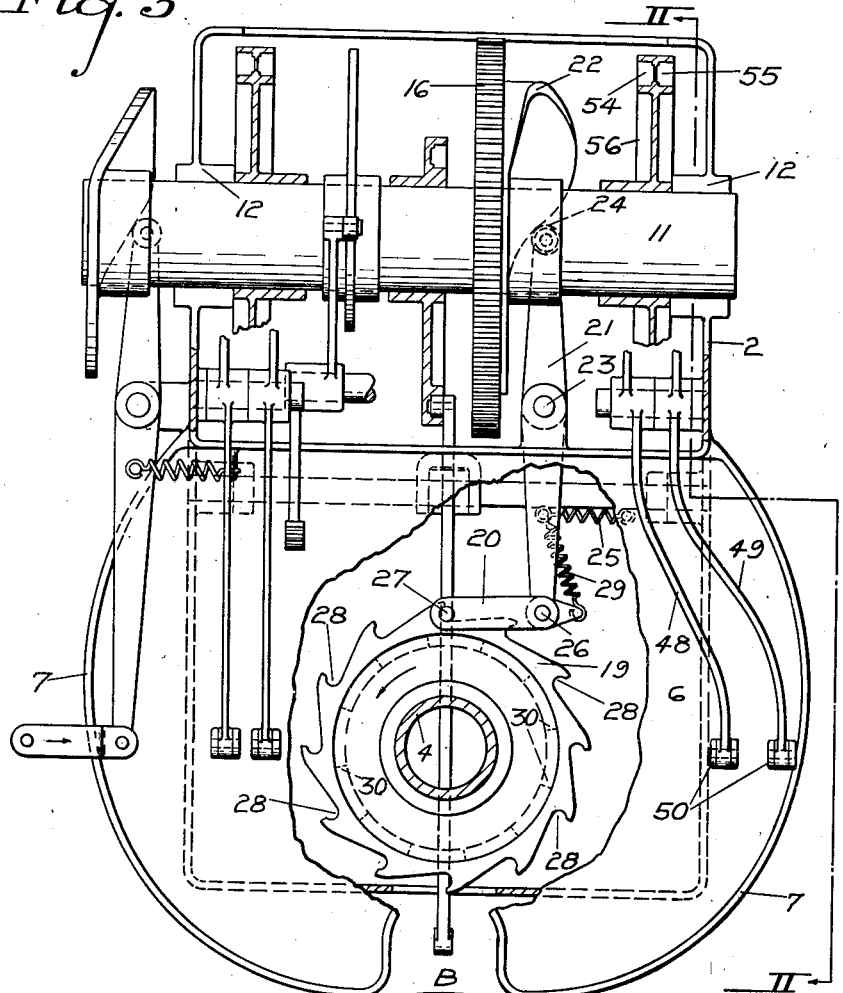
Figure 3 is a horizontal sectional view on the line III—III of Fig. 2.
Figure 4:
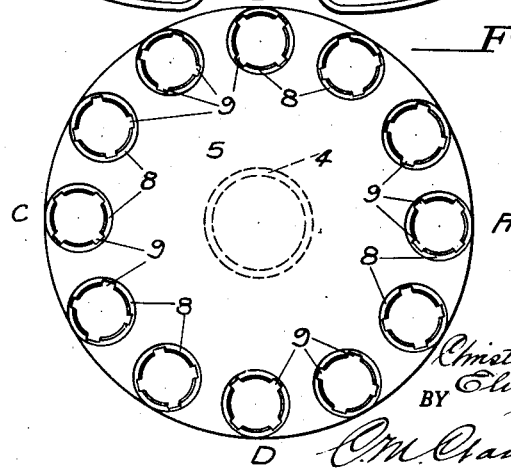
Figure 4 is a plan view of the turret.

As shown in Fig. 3 the outer edges 7 are rounded, and surround the turret, a drain connection being made at the lower level for cleaning purposes. Turret 5 is generally of the form of a flat wheel or disk, having an annular series of tapered sockets 8 open at the bottom and provided with lateral clearance openings 9 for the discharging plunger 10. Sockets 8 are of a size to receive and support on their flanged bottoms the cups or receptacles *a* as they are deposited therein for filling.

It will be understood that sockets 8 are in multiples of four, as twelve, so as to always locate a socket at four equidistant points around the center, in position for cup depositing, filling, capping, and discharge, at each intermittent rest period of the turret. The several mechanisms for such purpose receive their operative movement from a main transverse shaft 11 mounted in bearings 12—12 of the main frame 2. Shaft 11 is driven through gearing 13—14—15—16 or other suitable gearing, from a motor 17.

The machine may also be manually operated by crank 172 having suitable clutch connection with the motor shaft.

Turret 5 is intermittently rotated, say one twelfth of a revolution with an intervening rest period, by a ratchet wheel 19 and pawl 20 of lever arm 21 by cam 22 extending from or movable with gear 13. Lever 21 is pivoted at 23 and its terminal roller 24 is held against the annular face of cam 22 by a spring 25. Pawl 20 is pivoted at 26 to the other end of lever 21 and its free end has a terminal pin or roller 27 adapted to engage the successive teeth sockets 28 of the ratchet wheel 19 for each operation, under control of spring 29 secured to the other end of the pawl and to the lever, as shown.

The under side of ratchet wheel 19 is provided with a series of holding sockets 30 adapted to co-act with roller 31 of a spring retracted stud 32 mounted in a supporting housing 33 of the discharge plunger housing 34. In its intermittent rotation, one complete revolution of the turret will bring each of the annular cavities 8 into rest positions A, B, C and D respectively. In such positions, a cup is placed in the cavity at A, the cup is filled at B, the cover or cap is placed in the cup at C, and the filled cup is discharged upwardly at D.

The cups a provided with a rim b are nested in a vertical column above position A of the turret in a magazine tube 35 rigidly supported from the main frame of the machine. Each cup is tapered to fit snugly in the cavity 8 of the turret without binding and the lowermost cup of the magazine series is lowered into the particular registering cavity of the turret by the mechanism disclosed in said companion application Serial No. 40,796 and also in another copending application Serial No. 41,106.

Such mechanism is actuated from main shaft 11 through cam 56, the grooves 54—55 of which engage the terminal rollers 52—53 of lever arms 48—49. Said arms are connected by links 50—50 with the independently movable stems 43—47 by which the grasping clamps or jaws 44 are caused to extract and deposit the lowermost cup in the turret cavity.

After such depositing, turret 5 is moved around one space and the operation is repeated until the cups successively reach position B where each cup is filled with ice-cream or other suitable commodity by the unit delivering mechanism from the hopper E. Said unit forming and delivering mechanism is preferably of the construction shown in said first mentioned application but may be of any suitable type, and the present invention is not necessarily limited to use with any particular cup placing or cup filling means. In the intermittent progress of the turret the filled cups are brought successively into registering relation with the capper at position C.

The filled cups are there capped and covered by placing within the upper edge of each cup a thin paper disk 83 having a projecting withdrawal tang 163.

The cups a provided with a rim b are nested in a vertical column above position A in a slotted magazine tube 35 rigidly supported from a rear gear housing extension 36 by bracket 37. Each cup is tapered to fit snugly within the cavity 8 without binding. Means are provided for lowering the endmost cup into the cavity and arresting and detaching it while the remaining cups are lifted upwardly and there held until the turret has moved one space, when such operation is repeated.

For the purpose of positively separating and detaching the lowermost cup a, the pair of inwardly gravitating counterweighted fingers 38 are pivoted at 39 at opposite sides in downwardly extending arms 40 of the magazine tube.

Figure 2:
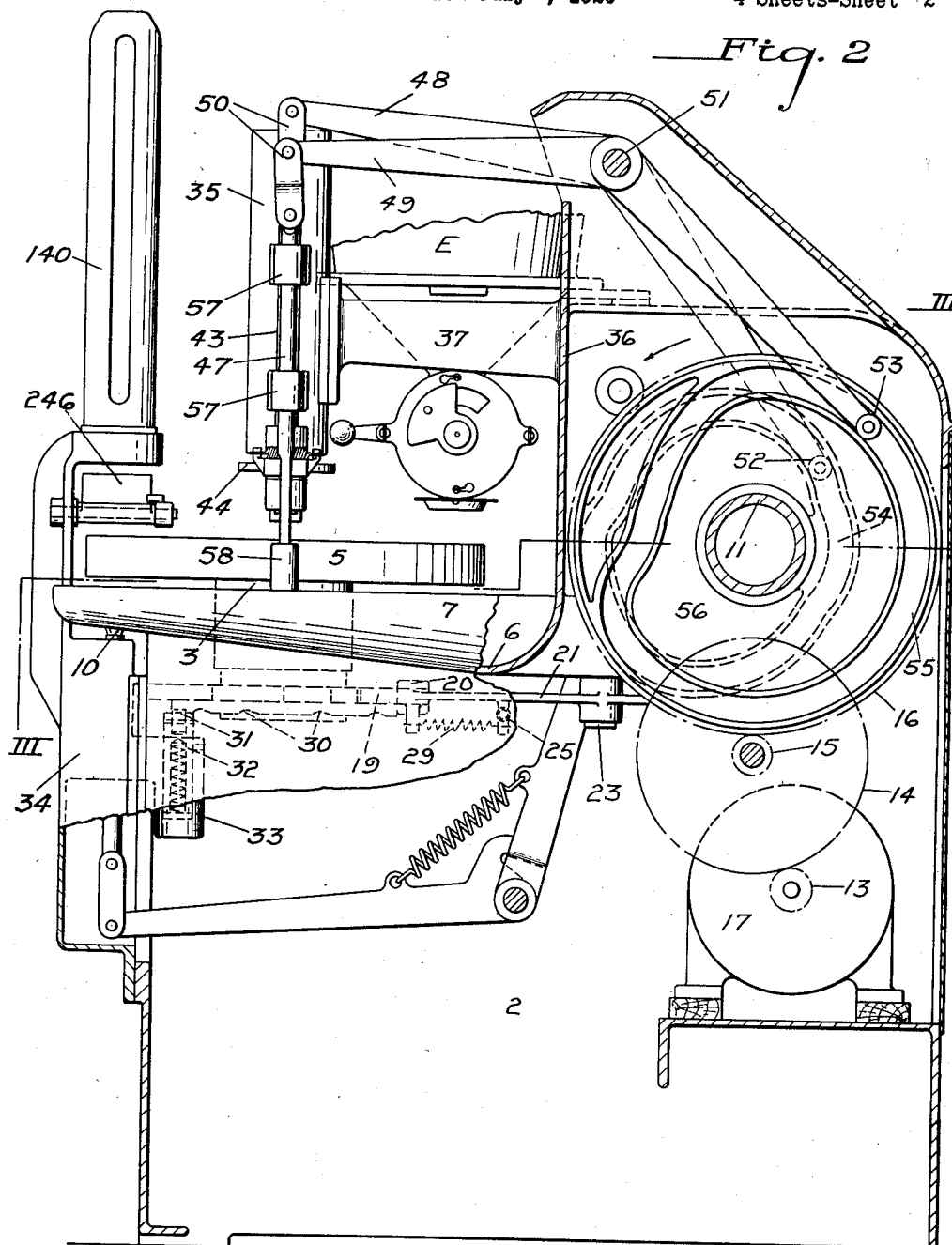
Figure 2 is a partial sectional view in side elevation, on the line II—II of Fig. 3.
Figure 5:
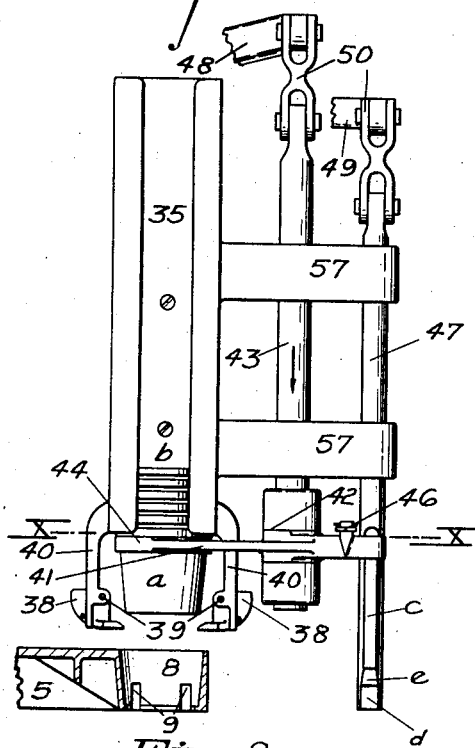
Figure 5 is an enlarged detail view of the cup depositing mechanism, showing the clamp raised.
Figure 6:
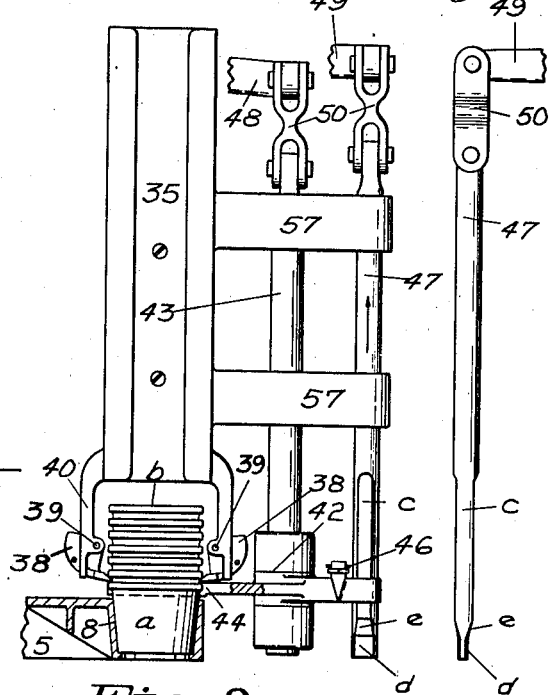
Figure 6 is a similar view showing the clamp lowered to place the lowermost cup in the turret cavity.
Figure 7:
Figure 7 is an edge view of the wedging spindle.
Figure 8:
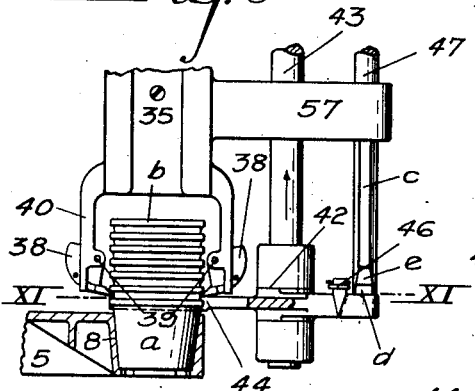
Figure 8 is a view similar to Fig. 6 with the clamp released from the lowermost cup.
Figure 9:
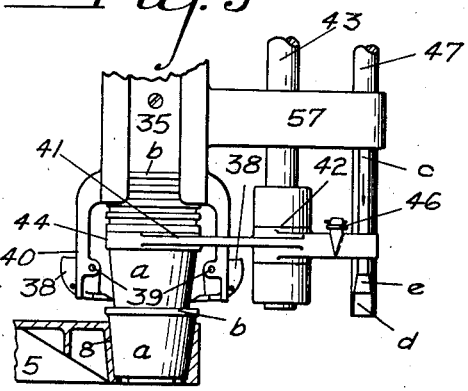
Figure 9 is a similar view showing the clamp engaging the next upper cup, and elevating the bank of cups beyond the stripper-retained lower cup.
Figure 10:
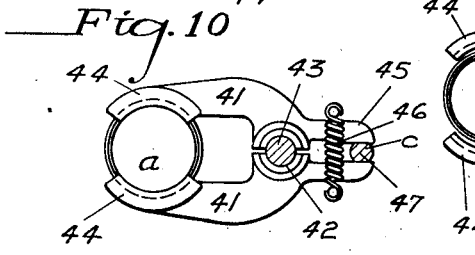
Figure 10 is a horizontal section on the line X—X of Fig. 5.
Figure 11:
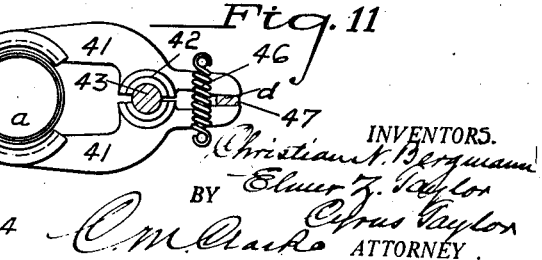
Figure 11 is a similar view on the line XI—XI of Fig. 8.

A pair of gripping tongs 41—41 are pivoted for opening and closing movement at 42 on the lower end of a vertically movable stem 43. The tongs have inner concaved clamping jaws 44 and outer lever extensions 45 which are normally drawn together by a spring 46 for opening the jaws. Between the levers 45 is a vertical wedging bar 47 having a jaw closing section c and a thinner jaw opening section d with an intervening wedge e. It is designed that stem 43 and bar 47 shall be raised and lowered independently and in synchronism in such a manner as to effect closing of the jaws to clamp around the rim of the lowermost cup as in Figs. 5 and 10; then to lower the entire bank of cups to place the lowermost one in cavity 8 of the turret wheel as in Fig. 6; then to release such cup as in Figs. 8 and 11; then to move upwardly the distance from one rim to the next with the jaws open; and then to close the jaws around the rim of the next upper cup and raise it with the entire series upwardly, leaving the lowermost cup released by fingers 38 in the cavity 8, as in Fig. 9. For such purpose bar 43 has a lever 48 and stem 47 has a similar lever 49 connected by links 50—50 and each fulcrumed on a hinge bar or stud 51. The other arm of said levers is each provided with a terminal roller 52—53 respectively riding in cam grooves 54—55 at opposite sides of cam 56 mounted on shaft 11. The grooves 54—55 are so designed (Fig. 2) as to effect independent raising and lowering of the levers and the clamping jaws and their controlling wedge bar in proper sequence to effect the operations above described. The stem and bar are each mounted in suitable guides 57 extending from the tube 35, and a protecting guard socket 58 for the lower end $d$ of bar 47 extends upwardly from the rim 7.

The rotation of the turret will bring each cup in its pocket successively to the filling position B where it is filled by the measuring mechanism described in said application, and then to position C where the cap or cover is placed in position.

After the cover is thus placed in the filled receptacle, it is carried around by the turret to the final ejecting position D, where each cup is pushed upwardly by plunger 10 through temporarily supporting mechanism 246 into the receiving slotted tube 140.

The several filled cups are removed from said receiving tube from time to time as they accumulate within enclosing paper bags, as described in said companion application.

From the foregoing description it will be understood that each of the sockets 8 of turret 5 are occupied successively by an empty cup at position A, and that as each arrives at the subsequent positions B, C and D, the successive operations of filling, capping, and discharging are performed.

The cup depositing mechanism forming the subject matter of the present application is efficient, accurate and reliable, in positively separating the lowermost cup from the series.

It places it within the turret pocket and then withdraws and supports the remaining superimposed cups, while arresting the placed cup against sticking or withdrawal.

The operation of the machine as a whole is continuous, rapid, and substantially automatic, merely requiring renewal of the cup and cap supply in their respective magazine tubes, with attention to the other incidental requirements of the machine.

The several movements are all effected through the various cams and their transmitting levers or equivalent thereof, in the manner described and illustrated. The machine as a whole is very compact and of comparatively small size, considering its capacity and speed of operation.

It may be changed or varied by the skilled mechanic in various details or features, or otherwise modified within the range of the general principle of operation, but all such changes are to be considered as within the scope of the following claims.

We claim:—

1. Mechanism for separating the lowermost one from a nested series of receptacles consisting of a pair of vertically and laterally movable gripping jaws, means for closing the jaws to embrace a lowermost receptacle, means for opening the jaws to release said receptacle, and means for moving the jaws to position to embrace an adjacent receptacle and move it and superimposed receptacles upwardly.

2. Mechanism for separating the lowermost one from a nested series of receptacles consisting of a pair of vertically and laterally movable gripping jaws, means for closing the jaws to embrace a lowermost receptacle and thereby support the series, means for effecting lateral opening of the jaws to release the lowermost receptacle and for then moving the jaws while open and closing them upon the next adjacent receptacle and for lifting said receptacle and the superimposed series.

3. Mechanism for separating the lowermost one from a nested series of receptacles consisting of vertically movable laterally separable gripping jaws, means for closing the jaws to embrace a lowermost receptacle, means for lowering the jaws to deposit said receptacle, arresting means for the receptacle, and means for opening the jaws and then raising and closing them around the next adjacent receptacle and for then raising the closed jaws to elevate the remaining receptacles of the series.

4. In combination with a guiding reservoir for a vertically arranged series of nested receptacles and means for detaching the lowermost receptacle, side gripping mechanism adapted to embrace a receptacle, and means for opening, closing, and lowering said gripping mechanism to deposit the lowermost receptacle and for then supporting and raising all of the superimposed receptacles.

5. In combination with a guiding reservoir for a vertically arranged series of nested receptacles and means for detaching the lowermost receptacle, a pair of pivoted gripping jaws having wedge engaging levers, a vertically movable supporting and pivoting stem therefor, and wedge mechanism for opening and closing the jaws.

6. In combination with a tubular guiding reservoir for a vertically arranged freely movable series of nested receptacles and means below the reservoir for detaching the lowermost receptacle, a pair of pivoted laterally separable gripping jaws below the reservoir having lever extensions, a vertically movable supporting and pivoting stem for the jaws, an opening spring for the jaws connecting the levers, and a vertically movable variable width controlling device between the lever extensions for regulating the movements of the gripping jaws.

7. Holding and releasing mechanism for grasping the lowermost of a series of nested receptacles to support the entire series with detachment of the lowermost one and subsequent grasping of the next upper one and further lifting, consisting of a pair of opening and closing jaws, a supporting and pivoting stem for the jaws having raising and lowering means, an opening spring connecting the jaws, a co-acting variable width element interposed between portions of the jaws for controlling their opening and closing, and independent raising and lowering means therefor.

8. Holding and releasing mechanism for grasping the lowermost of a series of nested receptacles to support the entire series with detachment of the lowermost one and subsequent grasping of the next upper one and further lifting, consisting of a pair of opening and closing jaws having lever extensions, a supporting and pivoting stem for the jaws, means for raising and lowering the stem, a spring engaging the lever extensions for opening the jaws, a vertically disposed rod of varying cross section between the lever extensions for regulating the movement of the gripping jaws, and independent means for raising and lowering the rod.

9. Mechanism for separating the lowermost one of a nested series of receptacles consisting of a vertical open bottom magazine casing, detaching devices for separating the lowermost receptacle, vertically adjustable laterally movable gripping jaws, means for closing the jaws to engage the lowermost receptacle, means for vertically moving the jaws to lower the lowermost receptacle to position while supporting the series, and means adapted to then open and clamp around the next adjacent receptacle and to elevate the remaining receptacles.

10. Mechanism for separating the lowermost one of a nested series of receptacles consisting of a vertical open bottom magazine casing, detaching devices for separating the lowermost receptacle, vertically adjustable laterally movable gripping jaws, means for closing the jaws to engage the lowermost receptacle, means for vertically moving the jaws to lower the lowermost receptacle for engagement by the detaching devices, and means adapted to then open to clamp around the next adjacent receptacle and to elevate the remaining series thereof.

11. In combination with a guiding magazine having pivoted detaching fingers depending from its bottom, a pair of clamping jaws, means for effecting successive engagement with the individual units of a series of cups in the magazine, means for opening and closing the jaws, and means for raising and lowering them.

12. In combination with a guiding reservoir for a vertically arranged series of nested receptacles, gripping and releasing mechanism consisting of a pair of laterally movable opening and closing jaws having receptacle engaging faces and bar engaging faces, a vertically movable stem pivotally supporting the jaws, a spring connecting the jaws, a bar of varying thickness engaging the bar-engaging faces of the jaws, and means for vertically actuating the stem and bar.

13. In combination with a guiding reservoir for a vertically arranged series of nested receptacles, gripping and releasing mechanism consisting of a pair of laterally movable opening and closing jaws having receptacle engaging faces and bar engaging faces, a vertically movable stem pivotally supporting the jaws, a spring connecting the jaws, a bar of varying thickness engaging the bar-engaging faces of the jaws, means for vertically actuating the stem and bar, and means for detaching the lowermost receptacle upon upward movement of superimposed receptacles.

14. Mechanism for separating the lowermost one from a nested series of receptacles consisting of a pair of vertically movable laterally separable gripping jaws, means for closing the jaws to embrace a lowermost receptacle by its rim for supporting said receptacle and the superimposed series, means for lowering the jaws to deposit the lowermost receptacle in a receiving socket, means for arresting the lowermost receptacle by engaging its upper edge, and means for opening the jaws and then raising and closing them around the rim of the next adjacent receptacle and for then lifting the closed jaws to elevate the remaining receptacles of the series.

15. Mechanism for separating the lowermost one from a nested series of receptacles consisting of a pair of vertically movable laterally separable gripping jaws, means for closing the jaws to embrace a lowermost receptacle by its rim for supporting said receptacle and the superimposed series, means for lowering the jaws to deposit the lowermost receptacle in a receiving socket, means for arresting the lowermost receptacle by engaging its upper edge to detach it from the superimposed receptacles and to prevent withdrawal from the socket, means for opening the jaws and then raising and closing them around the rim of the next adjacent receptacle and for then lifting the closed jaws to elevate the remaining receptacles of the series, and a guiding tube for the series of receptacles.

In testimony whereof we hereunto affix our signatures.

CHRISTIAN N. BERGMANN.
ELMER Z. TAYLOR.
CYRUS TAYLOR.